UNITED STATES PATENT OFFICE 2,466,369

ARTIFICIAL SNOW

Murriel H. Bunderson, Denver, Colo.

No Drawing. Application August 11, 1947,
Serial No. 768,065

4 Claims. (Cl. 41—10)

This invention relates to a process for producing artificial snow and to the product formed thereby.

The present invention has particular application to the forming of lasting decorating material having the color and sparkle of snow, which material may be used in a wide variety of applications for stage decorations, trimming display windows, moving picture sets, and the like.

The invention provides a product which is both non-toxic and substantially non-combustible which may be easily handled, and optionally can be used in loose, flake form adapted to be dropped or blown through the air in simulation of falling snowflakes, or can be piled loosely to represent the appearance of drifted snow. Moreover, the artificial snow of my present invention can be adhesively attached to supporting structures for decorative effects, as well as molded or shaped to any desired configuration. A particular advantage of the present process is that it will produce such a product having a pure white color, although, of course, if this is not desired, suitable coloring material may be added to it.

Other objects and advantages of the invention will be apparent from the present specification and claims, the invention being described by way of illustration with reference to particular reaction steps and specific proportions employed and thus providing a preferred example of my decorating material, it being understood, however, that these are given by way of illustration rather than as a necessary or precise limitation of the process and composition.

The present invention utilizes a cohesive, intimate mixture of boric acid and a finely comminuted, water dispersable, absorbent material. The preferred example of the comminuted material is starch, such as the refined corn starch of commerce, although the use in whole or part of one or more other substances of similar properties, such as a finely divided clay, talc, chalk, diatomaceous earth, bentonite, etc., are also contemplated.

In producing my decorative material, there is first prepared an aqueous suspension of starch in cold water, equal volumes of the two of which may be mixed together although this amount is not at all critical and any practical proportions may be used as required.

At the same time there is prepared a hot aqueous solution of a salt of boric acid such as borax (sodium tetraborate, $Na_2B_4O_7.10H_2O$) or other water-soluble salt such as the analogous alkali and alkaline earth salts. The ratio of 1 tablespoon of borax to 2 quarts of boiling water is a convenient proportion and to this there is added a small amount of substance capable of making the solution weakly acidic. Practically any acid or acid salt may be used for this purpose, a desirable concentration being on the order of 1 to 5 normal, although again this is not critical and may vary widely. Thus, for example, I may use a small amount of hydrochloric, sulfuric, nitric, oxalic, phosphoric, citric, maleic, tartaric acid or the like, or one of their acid salts. However, it is desirable in order to obtain a pure white material to employ an acid having bleaching properties and for this purpose one may conveniently use a commercial bleaching solution of hypochlorous acid (HClO). Such solutions have an acid content on the order of about 1–5% and a tablespoon of this is adequate for the 2 quarts of boiling water containing borax.

The cold aqueous suspension of starch is stirred slowly into the boiling mixture of acidic borax solution and its addition is continued until the mixture has become quite thick. The mixture is then allowed to cool and placed in a freezing unit until it has frozen hard, preferably at a temperature between 20 and 30 degrees Fahrenheit. The foregoing mixture will freeze solid in about 8 hours, after which it is allowed to thaw and the water is drained off of the intermingled precipitate. Remaining moisture can be squeezed out of the mixture by pressing it in a permeable fabric container, or by centrifuging, etc.

It appears that in the warm acidic borax solution, boric acid (orthoboric or boracic acid, $H_3BO_3$) is liberated and this is absorbed onto the surface of the starch or clay particles. While the liberation of boric acid from its alkali or alkaline-earth salts by the acid used may take place to a limited extent at room temperature, it is desirable to hasten the reaction by heating the solution to near the boiling point since this also increases the solubility of the liberated acid. On the other hand, excessive boiling may volatilize the boric acid with the steam driven off. Upon cooling, boric acid crystallizes out of solution and is mutually precipitated or flocculated with the starch or other powdered substance.

The product thus produced is found to have a pure white color with a more or less granular or flaky texture which glistens similarly to packed snow. The material has good cohesive properties for packing, and yet the constituent particles or flakes of the material can be separated from each other to provide a loosely packed bulk material, each of the individual particles of which is so light and of such a flaky nature that the material in this form can be dropped through the air or blown as by a wind machine, thereby producing a very realistic reproduction of a snow storm in actual progress.

Accordingly, it may be spread upon any convenient supporting surface such as wood, metal, glass, plaster board, cement, earth, etc. It may also be attached to flexible sheets of material such as canvas, parchment, and other kinds of fabric so as to be draped over supporting structures to represent piles of snow or the like. If desired, a layer of the present product may be attached to the backing material by means of an intermediate coat of suitable adhesive material such as vegetable glue, mucilage, and the like.

It will be appreciated that I have produced a comparatively inexpensive and highly useful product which may be employed for a wide variety of decorative purposes, being used alone and spread or attached to supporting surfaces; or, particularly with the addition of a little adhesive material and/or aggregates or bodying substances such as gravel, resin, sand, clay, papier-mâché cement, etc., may be molded to any desired shape.

I claim:

1. A process for preparing an artificial snow comprising mixing an aqueous suspension of starch with a warm aqueous acidic solution of borax, freezing the resultant mixture, allowing the mixture to thaw, and then removing the water therefrom.

2. A process for preparing an artificial snow comprising mixing an aqueous suspension of starch with a warm aqueous solution of borax and hypochlorous acid, freezing the resultant mixture, allowing the mixture to thaw, and then removing the water therefrom.

3. The method of forming an artificial snow which comprises precipitating boric acid in the presence of an aqueous suspension of starch so as to produce an intimate mixture of starch and boric acid and then removing the water therefrom.

4. The method of forming an artificial snow which comprises precipitating boric acid in the presence of an aqueous suspension of starch and hypochlorous acid so as to produce an intimate mixture of starch and boric acid and then removing the water therefrom.

MURRIEL H. BUNDERSON.

REFERENCES CITED

The following references are of record in the file of this patent:

UNITED STATES PATENTS

| Number | Name | Date |
| --- | --- | --- |
| 1,746,717 | Simpson | Feb. 11, 1930 |
| 1,890,127 | Oftedahl | Dec. 6, 1932 |